(12) United States Patent
Hansell et al.

(10) Patent No.: US 7,146,401 B2
(45) Date of Patent: Dec. 5, 2006

(54) METHOD FOR COMMUNICATING BUSINESS MESSAGES

(75) Inventors: Marysue Lucci Hansell, Villanova, PA (US); Raymond Hansell, Villanova, PA (US)

(73) Assignee: The Maray Corporation, Wayne, PA (US)

( * ) Notice: Subject to any disclaimer, the term of this patent is extended or adjusted under 35 U.S.C. 154(b) by 790 days.

(21) Appl. No.: 09/810,811

(22) Filed: Mar. 16, 2001

(65) Prior Publication Data
US 2003/0017436 A1   Jan. 23, 2003

(51) Int. Cl.
*G09B 19/18* (2006.01)

(52) U.S. Cl. ............... 709/206; 709/207; 434/107

(58) Field of Classification Search ........ 709/206, 709/207; 434/107; 706/925; 345/473, 709; 705/9; 700/109, 111
See application file for complete search history.

(56) References Cited

U.S. PATENT DOCUMENTS

| | | | |
|---|---|---|---|
| 5,954,510 A * | 9/1999 | Merrill et al. ............. 434/236 |
| 6,120,298 A * | 9/2000 | Jenkins et al. ............ 434/236 |
| 6,249,809 B1 * | 6/2001 | Bro .......................... 709/217 |
| 6,324,282 B1 * | 11/2001 | McIllwaine et al. ... 379/265.06 |
| 6,338,628 B1 * | 1/2002 | Smith ....................... 434/236 |
| 6,477,437 B1 * | 11/2002 | Hirota ........................ 700/95 |
| 6,535,861 B1 * | 3/2003 | O'Connor et al. .......... 706/11 |
| 6,662,161 B1 * | 12/2003 | Cosatto et al. ............ 704/260 |
| 6,736,642 B1 * | 5/2004 | Bajer et al. ................ 434/236 |
| 6,748,421 B1 * | 6/2004 | Ozkan et al. .............. 709/206 |
| 6,766,319 B1 * | 7/2004 | Might ......................... 707/4 |
| 6,788,987 B1 * | 9/2004 | Slechta et al. ............ 700/106 |
| 6,904,449 B1 * | 6/2005 | Quinones .................. 709/203 |
| 2002/0076674 A1 * | 6/2002 | Kaplan ..................... 434/107 |
| 2003/0017436 A1 * | 1/2003 | Hansell et al. ........... 434/107 |

OTHER PUBLICATIONS

Johansson, M. et al., "Interactive tools for education in automatic control", IEEE Control Systems Magazine, v 18, i 3, p. 33-40, Jun. 1998.*
Coomb, Norman et al.,"Enhancing Web instruction: using steaming audio and video", Information Technology and Disabilities (USA), v 6, i 1-2, p. 1-3, Apr. 1999.*
Datamation, "E-business: Intraca", www.products.datamation.com/e-business/intranet/983814922.html, pp. 1-2, Aug. 2005.*
McLeod, Susanna, "Jim Unger, Creater of Herman", www.suite101.com/article.cfm/12933/68035, p. 1, May 2001.*

* cited by examiner

*Primary Examiner*—Patrice Winder
(74) *Attorney, Agent, or Firm*—Caesar, Rivise, Bernstein, Cohen & Pokotilow, Ltd.

(57) ABSTRACT

A method for performing business training communications includes determining a targeted business and performing a needs analysis to determine a plurality of recipient events in accordance with the targeted business. A plurality of business training messages is determined in accordance with the plurality of determined recipient events. The method also includes providing an animation for each of the business training messages in accordance with the plurality of determined business training messages to provide a plurality of animation systems and providing the plurality of animation systems to a message user. A recipient event and a targeted message recipient are determined by the message user and an animation system of the plurality of animation systems is selected in accordance with the recipient event and the business training message of the selected animation system.

12 Claims, 3 Drawing Sheets

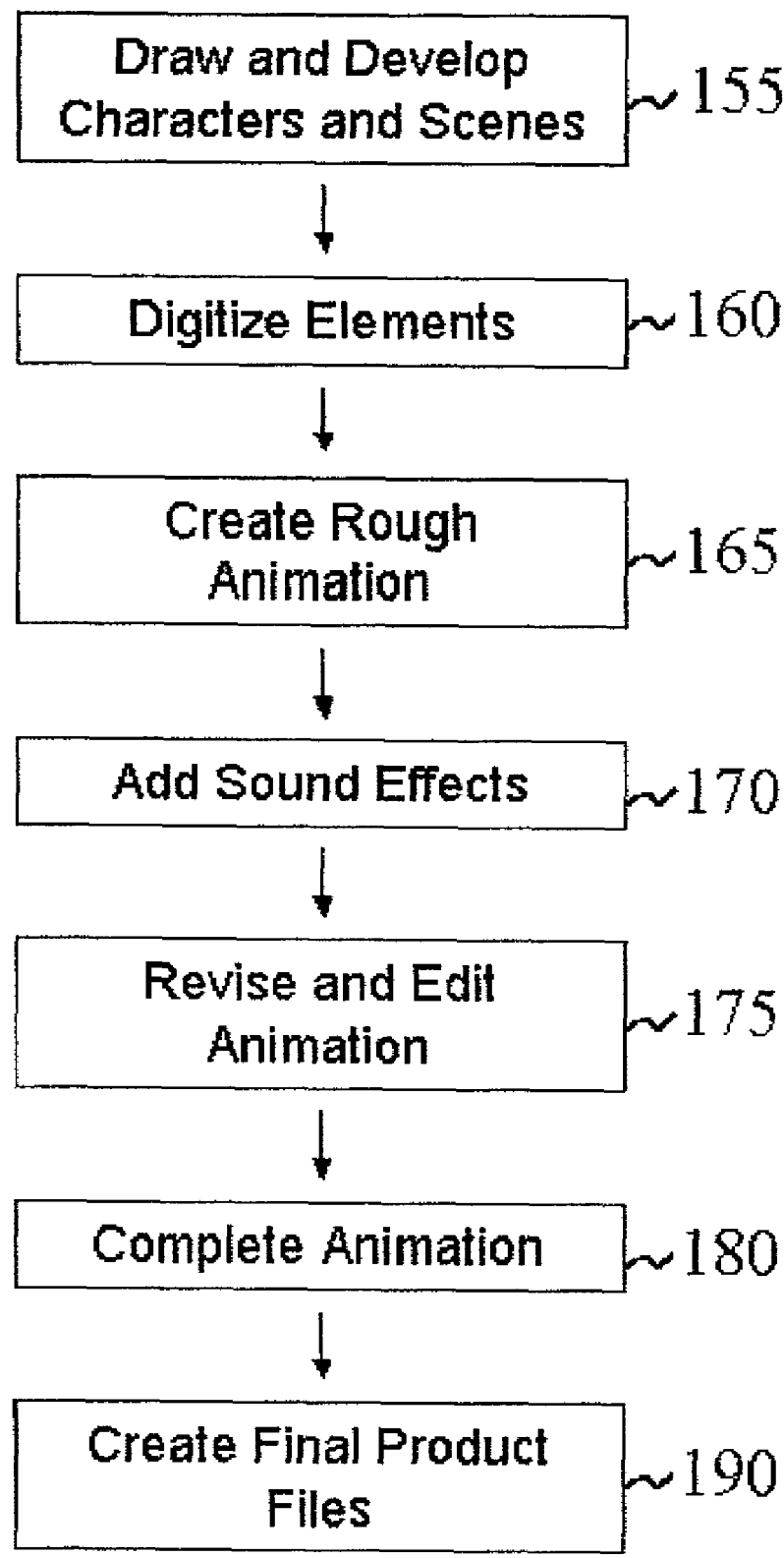

METHOD FOR COMMUNICATING BUSINESS MESSAGES

FIELD OF THE INVENTION

This invention relates to the field of business methods and, in particular, to the field of business training and communication methods.

BACKGROUND OF THE INVENTION

It is known to attach a message, including an animated message, to an email transmission in order to communicate the message to an intended recipient. For example, at www.hallmark.com a user can click on an electronic card link in order to transfer to a web page showing representations of a plurality of cartoons. The user selects a cartoon by clicking on it and instructions are provided to assist the user in getting the cartoon to load and display. The user can insert a personal message in the email along with a link to the cartoon.

The user is permitted to load and display the cartoon prior to transmitting it to the recipient. When the email is transmitted to the recipient, the recipient can read the personal message and click on the cartoon to initiate a load and display of the cartoon. Clicking on the cartoon causes the browser of the recipient to load and link to a web site where the animation files for displaying the cartoon are located. The software for processing the animation files and displaying the cartoon to the recipient is located at the recipient location. The Hallmark method includes transmitting a notice to the user that the recipient has received and opened the message.

bluemountain.com also teaches a method wherein a user selects an electronic card from a plurality of provided cards by clicking on one of a number of displayed cards. The cards provided by the bluemountain.com method include greeting cards and cards directed to a variety of special interests such as sports, art, literature, games and business.

The bluemoutain.com cards correspond to animated presentations having associated animation files. The user designates a recipient of the card as well as a sender. Optionally the user can provide a personal message for the recipient by inserting the personal message in the card. The card is transmitted by way of email to the recipient by clicking on a send button. Additionally, users are permitted to enclose their own voices, photos or animations within the card.

When the bluemountain.com email arrives at the recipient end a view card field is displayed. Clicking on the view card field causes a browser to load and link to a web site. In response to a click by the recipient the recipient is provided with a display of the animated cartoon selected by the user. The animation files are stored at the web site and the software for loading and displaying the animation files is located at the recipient location.

Typically the creative process for providing the animations of the prior art electronic messaging methods includes developing a message concept and story boarding it in order to express the message. The story boards are animated using well known animation or graphics programs. The animation technology used typically includes audio, animated sequences and text content.

It is also known to perform business communications using electronic messaging methods. In this application a management message is communicated to an employee or a trainee using electronic transmission in order to educate the recipient of the message. One known provider of such a business communication method is Intraca, Inc.

Intraca, Inc provides a business communication method wherein numerous comics drawings are associated with motivational quotations and provided to users in predetermined associated pairs. The drawings and quotations can be selected from various commonly available publications prior to being associated with each other. The stated goals of the Intraca Inc. method include helping to improve corporate communications.

To use the Intraca, Inc. method a user clicks on an icon displayed on a user home page and thereby accesses a link to a web page provided by Intraca, Inc. This launches a pop-up window that displays the comic and quotation posted by Intraca, Inc. for the current day at the recipient location. The choice of the comic and quotation can be customized.

Thus, using the Intraca, Inc. method users can provide recipients with business messages without creating the messages themselves and without building the overall presentation around the messages, thereby making it convenient to send such messages. Furthermore, since the associated drawings and quotations can be reviewed by the users, the Intraca, Inc. method is adapted to permit convenient preview of alternate content by users and to permit selection of content before it appears on their intranet.

SUMMARY OF THE INVENTION

A method for performing business training communications includes determining a targeted business and performing a needs analysis to determine a plurality of recipient events in accordance with the targeted business. A plurality of business training messages is determined in accordance with the plurality of determined recipient events. The method also includes providing an animation for each of the business training messages in accordance with the plurality of determined business training messages to provide a plurality of animation systems and providing the plurality of animation systems to a message user. A recipient event and a targeted message recipient are determined by the message user and an animation system of the plurality of animation systems is selected in accordance with the recipient event and the business training message of the selected animation system. The selected animation system is applied to the targeted recipient by the message user. The further step of transmitting an email directly to the targeted recipient and, where animation files are provided, transmitting the animation files to the location of the targeted recipient is included. The animation files are loaded and displayed using animation player programming or animation display programming disposed at the location of the targeted recipient. In one embodiment a digital file containing indicia of at least a portion of the selected animation system is provided and a visual representation of the portion of the selected animation system is applied to the targeted recipient. The plurality of animation systems can be transmitted to the message user by way of the internet or any other signal transmission channel as well as by way of any type of tangible recording medium.

BRIEF DESCRIPTION OF THE DRAWINGS

FIG. 3 partially shows one embodiment of the planning and development of content portion within the training and communication message process flow of the method of the present invention.

DETAILED DESCRIPTION OF INVENTION

Figure 1:
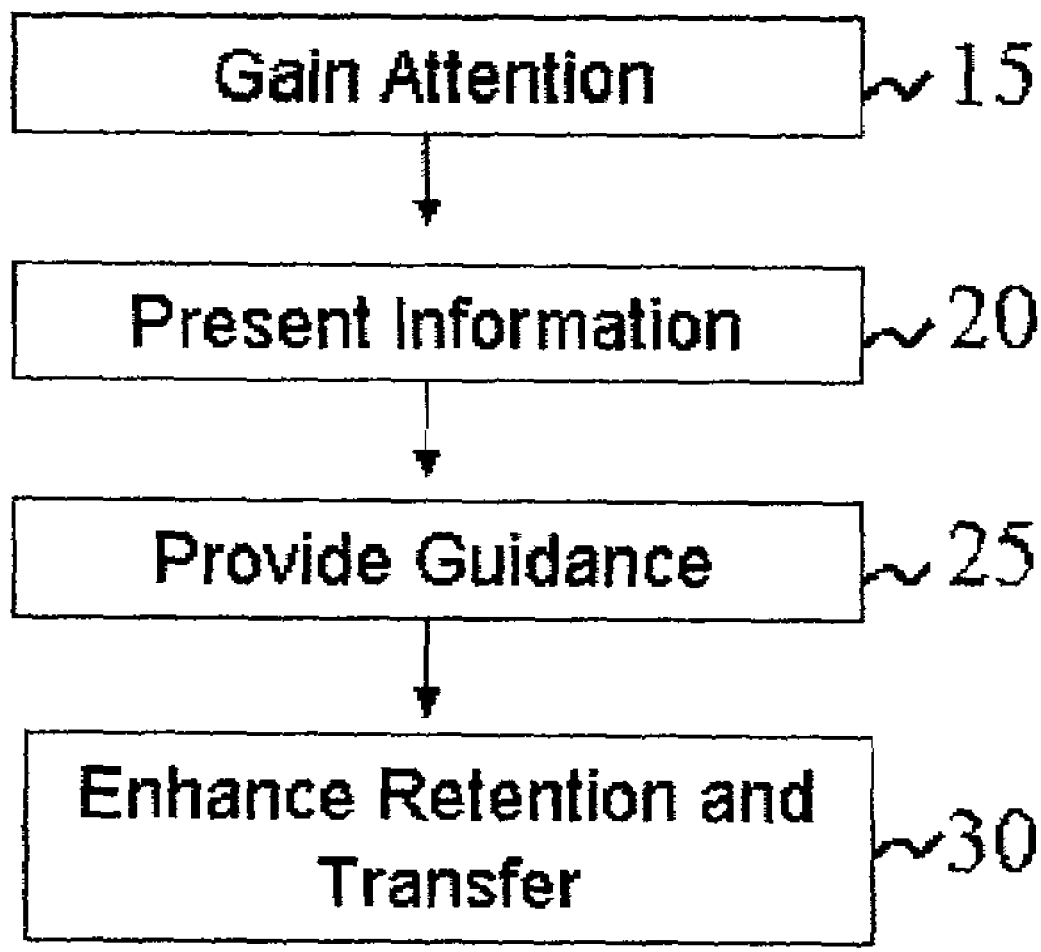
FIG. 1 shows a learning process flow known in the field of instructional design.

In the method of the present invention a business message is communicated to a target individual in the form of an animation system. In the preferred embodiment the animation system is a short animation package that communicates a business message in an entertaining way. It is believed that the animation systems of the invention can be most advantageously applied in the field of providing training messages to recipient employees by user employers to train and communicate the recipient employee according to a selected message.

Accordingly, each animation system can provide the recipient with a specific tip or set of tips to assist the recipient in improving performance, productivity and work habits. In one preferred embodiment an animation system can be delivered directly to the desktop of the recipient. In an alternate embodiment an animation system is used within training presentations where it can be delivered to any number of recipients. Other delivery methods are set forth herein below and it is contemplated that the messages can be delivered using any method desired by a user.

In order to create the animation systems of the present invention a general understanding of the targeted business area must first be obtained. For example, the targeted business area can be an area such as customer service or human resources or any other business area. The general needs analysis of the present invention including a review of common issues and a sampling of potential targeted recipients is conducted to identify a problem which is commonly confronted in the targeted business area. An appropriate business message is selected in view of the needs analysis. The general needs analysis can include methods such as sampling of potential recipients or the use of focus groups.

When the message is determined supporting information can be provided if appropriate. The supporting information can include statistics, quotes or any other information determined by the creator of the animation system in anticipation of the requirements of the potential user of the method. Training points are then determined in accordance with the business message.

The message selection process described above is preceded by a period of brainstorming to determine an initial concept and training objective. In order to determine the initial concept and training objective the possible topics relating to the targeted business area are identified. In order to assist in organizing the identified topics they are classified according to categories and subcategories. For example, in the business area of telephone interaction as performed in call centers a topic can be identified and classified in the category of problem solving within the subcategory of showing empathy.

A specific message is developed for the chosen subcategory. For example, in the case where showing empathy is the sub category an appropriate message can be that the first step in solving the problem set forth by the customer is establishing empathy with the customer. A scenario is developed to illustrate the learning objective. For example, a scenario can be developed which demonstrates how a customer becomes upset when he or she does not feel that an employee empathizes with their situation. A management message having tips and other information is provided for illustrating effective ways to meet the objective of the animation system. The message is preferably provided in a concise humorous form known as a tag line or management message.

Although the recipient of the animation system messages may be generally known during this process, the method of the present invention does not include testing to assess the recipient either prior to interaction with the animation system or after. For example, while demographic information of a general nature regarding operators at call centers may be known, there is no need to actually interview or study any particular call center operators. Any other training management tools can be developed and used with the animation system messages.

Furthermore, the method does not require any user interaction tracking, storing or evaluation of the recipient. It is possible, however, to determine whether the recipient has opened the email using methods conventionally available on most personal computer systems. Additionally, the user of the animation system can contact the recipient afterwards to discuss the matter or even request that the recipient watch the animation system with the user present.

The design of messages in this manner uses elements of the field of instructional design. Instructional design is a well known educational discipline involving the process of defining a message or learning element. The definition may be determined according to the characteristics of the audience and according to the training objective.

Referring now to FIG. 1, there is shown learning process 10. Learning process 10 is a well known method of instructional design which is incorporated within the method of the present invention. Step 15 of learning process 10 includes gaining the attention of the recipient by presenting a problem or a new situation. Preferably this step includes using an interest device for getting the attention of the recipient so that he or she will watch and listen to the message. In the present invention the interest device is the animation that is designed around the business message.

In order to serve this purpose the animation tells a story, usually a humorous story, demonstrates a point and presents the problem to be solved. Additionally, the animation can demonstrate doing something the incorrect way and doing it the correct way. Furthermore, the animation can impress upon the recipient the importance of the message being illustrated.

The information of the message is presented to the recipient in step 20. Since the material is broken down into a short highly focused package in the method of the animation system the ability of the recipient to remember it is improved. Guidance is provided to the recipient as shown in step 25, for example in the form of tips determined in accordance with the business method of the animation system. The guidance of step 25 is in addition to the message of the animation system, it is the guidance on how to learn that is provided by the method of the invention or any other quality learning experience.

Additionally, the recipient should be informed about similar problem situations and provided with additional practice in accordance with conventional principles of the learning process in order to enhance retention and transfer as shown in step 30. In the method of the invention step 30 is performed in the workplace after the animation system is transmitted. Step 30 can be performed in accordance with course guide exercises provided to the user along with the animation systems of the present invention.

Figure 2:
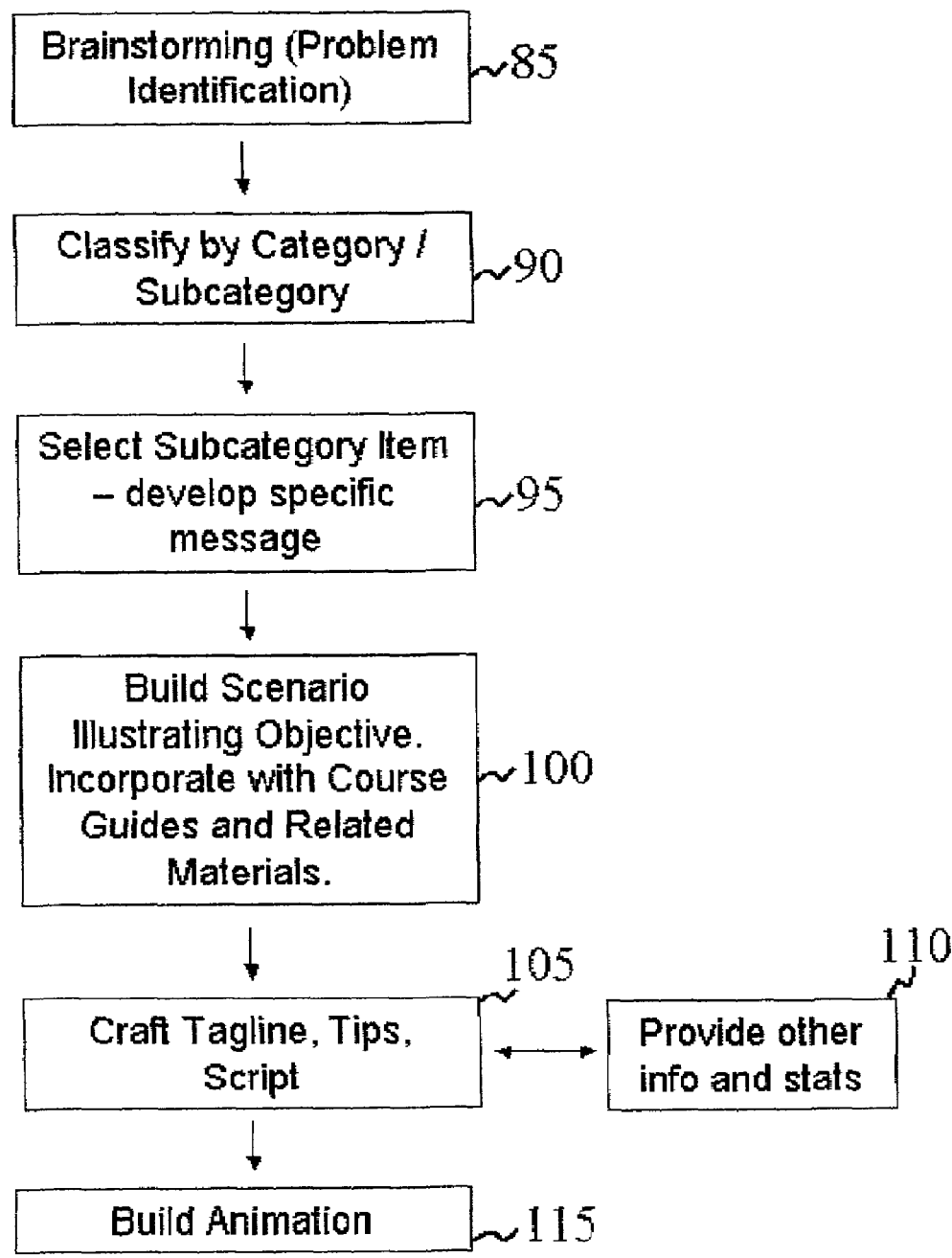
FIG. 2 partially shows one embodiment of the planning and development of content portion within the training and communication message process flow of the method of the present invention.

Thus, in accordance with one preferred embodiment of the invention described herein above, the method can be represented in process flow 80 as shown in FIG. 2. In process flow 80 the problem identification is performed as part of brainstorming sessions as shown in block 85. The problem is classified according to category and subcategory as shown in block 90 and a subcategory item is select for developing a specific message as shown in block 95.

A scenario is built to illustrate the objective as shown in block 100. A tag line or management message, tips and script are crafted and other information can be provided if desired as shown in blocks 105, 110. Process flow 80 then proceeds to the building of the animation as shown in block 115. The building of the animation is shown as process flow 150 of FIG. 3. In process flow 150 the characters and the scenario are drawn and developed as shown in block 155.

The elements thus drawn are digitized as shown in block 160 and a rough animation is prepared as shown in block 165. Sound effects can be added as shown in block 170 and the animation can be revised and edited as shown in block 175. As shown in block 190 the final product files are created when the animation is complete as shown in block 180. The product files of block 190 can include files such as the well known swf files, pdf files, ppt files, or any other type of files suitable for storing the required information in the manner of these well known files.

Any number of product files produced in this manner can be packaged for delivery to a user. The user can receive delivery of the package by way of the internet or CD-ROM or any other method known to those skilled in the art and, regardless of how the animations are packaged or received by the user, the user can apply the messages to the targeted recipient or recipients by email, printed out posters and any other method as described herein below.

After the initial design steps the animation systems are created by known methods such as drawing and developing characters using pencil drawings or digital drawings to perform story boarding. When story boarding is complete a rough animatic is developed to test the animated sequences. When the animated sequences are tested a complete animation is developed including sound and effects. The product files are then completed from the completed animation and the production steps are performed.

In the preferred embodiment of the invention Macromedia® Flash(tm) is used to create the product files. Additionally, any other delivery format known in the art can be used for creating similar product files. For example, Microsoft® PowerPoint®, Apple Quick Time, Windows Media Player, Microsoft Video and Real Player Streaming Media formats can be used. Regardless of which product file format is used to create the final product files the steps for importing the characters and settings into the desired format are substantially the same.

Furthermore, regardless of which product file format is used, the modules can be provided in several different formats, such as printed-out posters or an instruction book for live presentation. Thus, animation system messages can be transmitted independently of each other in any other supported media. Furthermore, a plurality of selected product files can be provided to a user in a package, for example, by way of the internet, a area network, a wide area network or a virtual private network of any other type, or on an information recording medium such as a CD-ROM.

Since the messages provided using the animation system are broken down into individual small single message units, the method of the animation system is a highly modularized method. Furthermore, the modules are highly focused since they are developed around only a single message or a small set of messages. The training information created for a recipient can thus be provided in short targeted bursts, wherein the bursts of information are each focused on the single message or small set of messages the user intends to communicate to the recipient. In one preferred embodiment of the invention the animation systems can have an average length of, for example, approximately fifty seconds.

Conventional on-line short training presentations can sometimes be at least approximately fifteen minutes long. Thus, in this example, the recipient can be locked into the entire fifteen minutes of the presentation even though some of the messages delivered during the presentation may not be particularly relevant at the time. By not locking the recipient into messages that are not directly on point the modular training presentations of the invention permit the recipient to focus more on the intended messages.

Each of the short animation systems can serve as a module in a training presentation wherein each module selected for inclusion in the presentation is focused on its own single well defined message or small set of messages. The use of such modules permits training presentations to be built topic by topic in any order desired by the user. Building training presentations in this modular manner provides greater flexibility than the methods used for building conventional modules since any different module can be selected and assembled according to the current needs of the user.

Additionally, selected messages can be repeated as desired by the user. For example, differing animation systems built around the same message can be used or the same animation systems can be repeated during the presentation. Furthermore, selected messages can be associated with other messages by determining the order of the animation systems within the presentation.

The targeted animations of the invention can be used to welcome new hires to a company or to acknowledge personal achievements. They can also provide feedback or instruction to a recipient via email immediately upon determining that the message of the animation is desired for any reason. For example, immediately upon observing a behavior to be enforced in a recipient an animation system built around a reinforcing message can be transmitted to the recipient.

Or, immediately after observing behavior to be discouraged an animation system message teaching more desirable behavior can be transmitted to the recipient. For example, upon monitoring a telephone call showing poor pacing in a telephone conversation, an animation system with a message providing instruction on pacing can be transmitted to the recipient. Upon observing a loud conversation animation systems targeted to the subject can be transmitted to the parties. The animation systems available for selection on such occasions can be listed in a catalog in order to facilitate review and selection by the user.

The user can also send transmissions containing animation systems in connection with scheduled activities. For example, animation systems can be transmitted to employees to inform them of corporate training events or meetings, or any other type of meetings. The animation system can also be used to introduce meeting or event topics. Furthermore, conventional email programs can be used to schedule the delivery of animation systems to the specified recipients at times or intervals determined by the user. This permits the animation systems to be easily used for recurring events or in campaigns or other initiatives.

Additionally, courseware is provided to the user along with the animation systems. The courseware can include classroom activities and group discussion questions along with follow up activities. The user can thus follow a complete course guide including a collection of specified animation systems to provide training on a selected topic. Alternately, the user can select animation systems from the catalog of animation system training modules and combine them with the materials of the courseware to create a customized training presentation for a particular application.

Furthermore, a user can use the specialized digital files to provide training in multiple formats. For example, the method can include exe format email reminders of a presentation, a pdf format file for producing handouts and flyers for in-class presentation or reminder notes, and an exe format email follow-up for reinforcing key points taught in the presentation. Materials for a PowerPoint® presentation can also be provided from the ppt format. It will be understood that any other form of animation files can be used in addition to swf files and that any other file formats besides pdf and ppt can be used for the handouts, flyers, posters, PowerPoint® or any other modes of graphical presentation or formatting. Additionally, files of any other format can be transmitted by way of or posted on the internet, a local area network, a wide area network, or any other type of virtual private network using any communication format.

The content selected from the catalog can be applied to the printed handouts or flyers for circulation to users. Group presentations can also be performed by projecting files or PowerPoint® presentation in accordance with the animation systems selected from the catalog. Furthermore, classroom delivery using PowerPoint®, course guides and modules, printed handouts and flyers, or any other method can be performed in accordance with the catalog.

Selected animation systems can be sent to specific individuals as an attachment to an email in order to address a specific problem. For example, the supervisor of a call center may notice that one of the employees has a problem with the pace while on the phone. In order to address the problem and provide tips on how to avoid this in the future, the supervisor can select an email addressing the issue and transmit it to a single employee. Alternately, an animation system can be sent to a whole department or company. For example, if employees in a department are not adhering to a dress code policy an email outlining the company policies on business attire can be transmitted or posted to the entire department.

Animation systems can be transmitted or posted as periodic reminders to remind employees about important issues. They can be used to send messages and reminders regarding the current objectives of the company. For example if a company objective is to increase sales by closing more calls an animation system selected to demonstrate sales closing skills can be transmitted.

Additionally, a course guide is provided in order to assist users in creating a complete course by combining a number of training modules. Thus, the user can combine a number of animation systems for a selected category or can mix animation systems from any different categories in addition to merely following the recommended course guide.

While the invention has been described in detail and with reference to specific examples thereof, it will be apparent to one skilled in the art that various changes and modifications can be made therein without departing from the spirit and scope thereof. For example, in addition to the embodiment wherein training messages are transmitted, motivational messages can also be transmitted. Thus, without further elaboration, the foregoing will so fully illustrate the invention that others may, by applying current or future knowledge, adapt the same for use under various conditions of service.

We claim:

1. A method for performing a business training communication in a communication system including a computer having computer memory, a computer communication channel and a display device, comprising:
   (a) determining a targeted business area;
   (b) sampling potential recipients of said business training communication;
   (c) performing a needs analysis of an event of said targeted business area upon said computer in accordance with said sampling of said potential recipients to provide an analyzed event;
   (d) storing said needs analysis in said computer memory;
   (e) determining a plurality of business training messages by said computer operating upon said computer memory in accordance with said needs analysis;
   (f) providing a respective animation module focused on each business training message of said plurality of business training messages to provide a first plurality of single message animation modules wherein each single message animation module includes a single business training message;
   (g) selecting a second plurality of single message animation modules from said first plurality of single message animation modules in accordance with the individual needs of a selected message recipient to provide a first subset of single message animation modules and a remaining subset of single message animation modules;
   (h) communicating said first subset of single message animation modules to said display device by way of said communication channel;
   (I) displaying said first subset of single message animation modules to said selected message recipient on said display device;
   (j) removing at least one single message animation module from said first subset of single message animation modules and adding to said first subset of single message animation modules at least one single message animation module from said remaining subset of single message animation modules to provide a second subset of single message animation modules; and
   (k) displaying said second subset of single message animation modules to said selected message recipient on said display device.

2. The method for performing business training communications of claim 1 wherein step (h) comprises the further step of transmitting an email directly to said selected message recipient.

3. The method for performing business training communications of claim 2, including the step of providing animation files wherein step (h) comprises the further step of transmitting said animation files to the location of said selected message recipient.

4. The method for performing business training communications of claim 3, further comprising loading and displaying said animation files using animation programming disposed at said location of said selected message recipient.

5. The method for performing business training communications of claim 1, further comprises providing said plurality of animation modules to said message user by way of the internet.

6. The method for performing business training communications of claim 1, further comprises providing said plurality of animation modules to said message user by way of a tangible recording medium.

7. The method for performing business training communications of claim 6, wherein said tangible recording medium comprises a CD-ROM.

8. The method for performing business training communications of claim 6, further comprising selecting from said plurality of animation modules by said message user a further plurality of animation modules for applying the animation modules of said further plurality of animation modules to at least one message recipient.

9. The method for performing business training communications of claim 8, further comprising selecting said further plurality of animation modules by said message user from a catalog of system animations provided to said message user.

10. The method for performing business training communications of claim 1, wherein said analyzed event comprises an event specific to said selected message recipient.

11. The method for performing business training communications of claim 1, wherein said analyzed event comprises an event specific to a plurality of employees.

12. The method for performing business training communications of claim 1, further comprising applying said selected animation module to said selected message recipient by way of the internet.

* * * * *